June 3, 1924.

G. A. SELVIG

BUTTER CUTTER

Filed Oct. 27, 1920   2 Sheets-Sheet 1

1,496,494

INVENTOR
GUSTAF A. SELVIG
BY Paul & Paul
ATTORNEYS

June 3, 1924.　　　　　　　　　　1,496,494
G. A. SELVIG
BUTTER CUTTER
Filed Oct. 27, 1920　　2 Sheets-Sheet 2

INVENTOR
GUSTAF A. SELVIG
BY Paul & Paul
ATTORNEYS

Patented June 3, 1924.

1,496,494

UNITED STATES PATENT OFFICE.

GUSTAF A. SELVIG, OF MINNEAPOLIS, MINNESOTA, ASSIGNOR, BY MESNE ASSIGNMENTS, TO NORTHERN EQUIPMENT AND SUPPLY CO., OF MINNEAPOLIS, MINNESOTA.

BUTTER CUTTER.

Application filed October 27, 1920. Serial No. 419,932.

*To all whom it may concern:*

Be it known that I, GUSTAF A. SELVIG, a citizen of the United States, resident of Minneapolis, in the county of Hennepin, State of Minnesota, have invented certain new and useful Improvements in Butter Cutters, of which the following is a specification.

This invention relates to butter cutters of the type which are adapted to cut a block or print of butter into small individual pieces or parts for table service. Broadly, the device consists of a base upon which the present commercial print of butter may be placed. These prints are usually one pound blocks of butter in rectangular form. The cutter member consists of a rectangular frame supporting cutting wires which are strung across its inclosed space. The frame is adapted to be downwardly forced through the butter to the base so that the cutting wires pass through the print and divide the butter into the desired individual service pieces. This present invention is principally directed to improvements in the butter cutter which forms the subject matter of the prior patent granted to the inventor hereof, No. 1,288,702, December 24, 1918.

The object of the invention is to provide an improved butter cutter.

Other objects of the invention will more fully appear from the following description and the accompanying drawings, and will be pointed out in the annexed claims.

In the accompanying drawings has been disclosed a structure designed to carry out the object of the invention, but it is to be understood that the invention is not confined to the exact features shown, as various changes may be made within the scope of the claims which follow.

Figure 1:
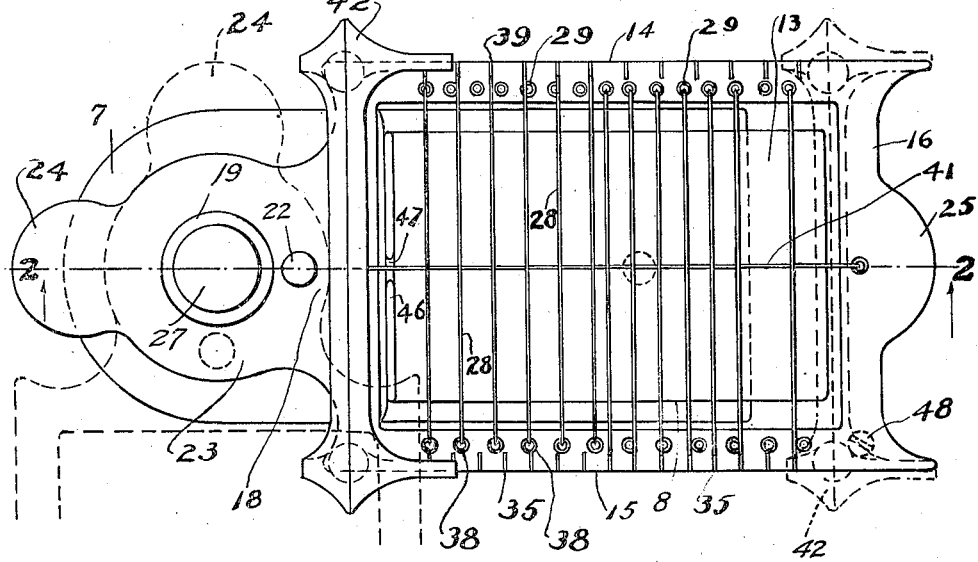
Figure 1 is a plan view of the improved butter cutter.
Figure 2:
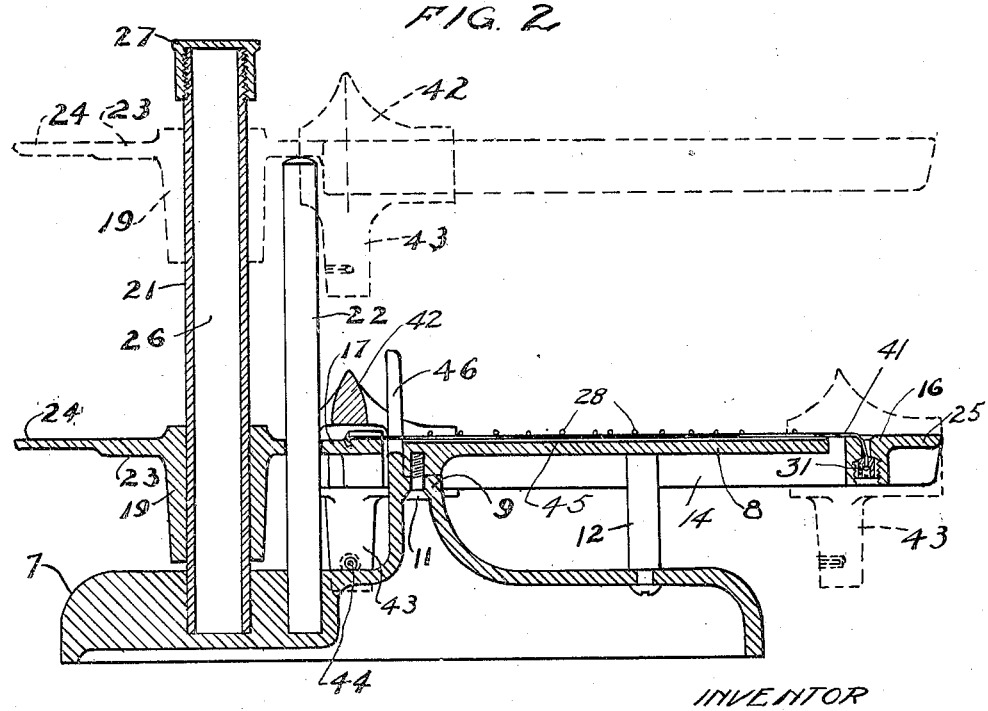
Figure 2 is a section on the line 2—2 of Figure 1, and shows, in dotted lines, the frame also in raised position.
Figure 3:
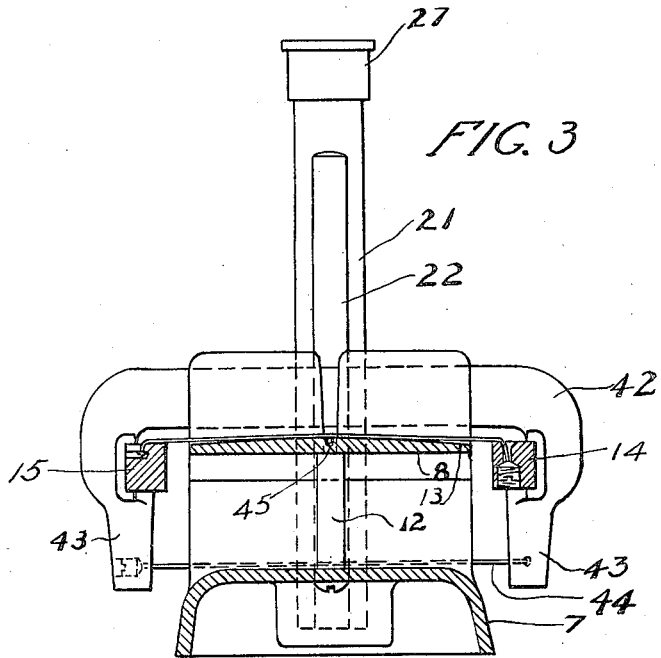
Figure 3 is a transverse sectional view.

This novel butter cutter includes a base 7 which is provided with a surface adapted to have a print of butter placed thereon. In this preferred embodiment of the invention such surface is provided by means of a plate 8 which is supported above the base by means of the shoulder 9 to which the plate is secured by the screw 11. Forwardly the plate is supported by means of the stud 12 upwardly projecting from the base. The usual rectangular print of butter is adapted to be placed upon the upper surface of this plate 8. A butter-cutting frame preferably of rectangular shape is provided with a plurality of cutting wires which extend across the space comprehended by the sides of the frame. This frame is adapted to be downwardly pressed so that the cutting wires are downwardly forced into the butter to the surface of this plate whereby the butter is cut.

An improved embodiment in this device consists in having the upper surface 13 of this plate 8 convex. The function of this surface convexity is to distribute the wire strain more equally when the wires are pressed upon this surface after passing through the butter print. It has been found that, when the surface of the plate is a plane, the cutting wires are broken along the edge of the plate. This is due to the fact that the usual operative will press and downwardly force the frame so that the cutting wires which extend beyond the side edges of the plate are bent to a greater or less degree in each operation of the cutting frame. The convex surface permits a gradual bending of substantially the wire lengths. This surface convexity has been found to overcome such disadvantage.

The cutting frame here disclosed consists of side rails 14 and 15 and end rails 16 and 17. The end rail 17 is preferably connected by a web 18 to a hub 19 slidably and rotatably received upon the standard 21 mounted upon the base 7. The frame may therefore be raised and lowered to cut the butter by being moved up and down the standard 21. In order that the cutting wire may be accurately guided when lowered and forced downwardly through the butter, a post 22 is rigidly mounted in a recess in the base 7 and upwardly projects therefrom preferably in parallelism with the standard 21. The web 18 of the cutter frame is apertured to permit passage therethrough of the guide post 22. This aperture is of such diameter as to form a close running fit for the post 22. The post 22 is formed so that it is of less height than the standard so that when the frame is raised on the standard above the guide, the frame may be rotated or turned so that the under surface of the web will rest upon the guide and the frame will thereby be supported in raised position.

Preferably the hub 19 is provided with an annular flange 23 so that the inner face of the flange may rest on top of the post 22 in a plurality of raised inoperative positions. To facilitate movement of the cutting frame a finger grip 24 is provided by the hub 19 at one end of the frame while a substantially smaller grip 25 is integrally carried by the end rail 16 of the frame.

In this embodiment of the invention the standard 21 is preferably tubular and provides a chamber 26 within which may be stored extra wires, spare plugs and tools such as a screw driver. The standard is terminably provided with a cap 27, which not only functions as a closure for the storage chamber, but also functions as a stop for the hub 19, so that the frame may not be removed from the standard unless the cap be removed from its threaded engagement with the end of the standard 21.

Figure 4:
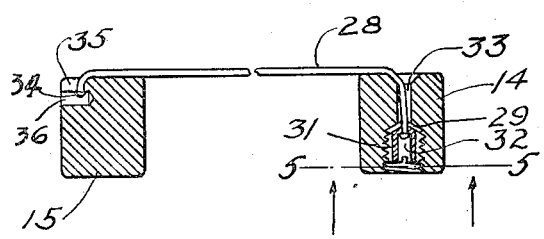
Figure 4 is a detailed sectional view showing the preferred manner of mounting the cutting wires.
Figure 5:
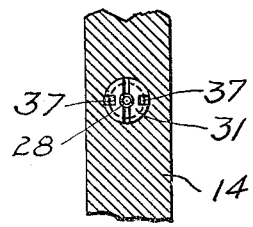
Figure 5 is a section on the line 5—5 of Figure 4.
Figure 6:
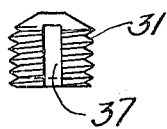
Figure 6 is a detail view of one of the plugs.

The cutting wires may be of any desired number according to the length of the frame and desired size of the butter pats or pieces. The preferred manner of securing the cutting wires 28 is shown in the detail view in Figure 4 wherein a side rail 14 is shown as provided with a recess 29 adapted to receive in threaded engagement a plug 31. This plug is longitudinally apertured to permit insertion therein of a cutting wire 28, the end of which is up-set and thereby retained in the recess 32 in the plug. The rail recess 29 is provided with a reduced portion 33 which extends to the top side of the rail and through which the cutting wire 28 is passed. The other end of the cutting wire is similarly up-set to provide a similar head 34 and the terminal portion of the wire is bent so that the bent portion may be passed through a slot 35 formed in the outer surface of the side rail 15 and the head 34 may be inserted and seated within an enlarged slot portion 36. The insertion of the slot end of the wire is easily accomplished when the plug 31 is screwed inwardly thereby affording slack or permitting the wire 28 to be further withdrawn from the recess 29 of the rail 14. After the slot end of the wire is positioned the threaded plug 31 is backed off, whereby the wire is placed under tension and thereby tautly maintained across the space comprehended between the side rails.

It has been found in the use of this wire attaching means that moisture from the butter collects in the plurality of recesses in the side rails. Therefore, means have been provided to drain the recesses. As here shown, each plug 31 is longitudinally cut away to provide a pair of diametrically opposed drainage slots 37, which permits the moisture to drop away from the recess.

In this improved device, provision is made so that, not only are the cutting wires carried by the frame at uniformly spaced intervals but also, the spacing may be changed as desired. In the embodiment shown in the drawings two such spaced intervals are possible.

In Figure 1, the upper transverse face of the frame is shown with its side rails 14 and 15 provided with two sets of oppositely disposed complementary wire-attaching means. For convenience of illustration, the right portion of the frame is shown with the wires in what may be termed the close spacing, while on the left, is shown the wires in the relatively wide spacing, but, it is to be understood that the wires of a cutting frame are usually uniformly spaced either closely or widely.

As here shown, the side rail 14 is provided with a plurality of uniformly spaced recesses 29 which are oppositely disposed and complementary to the slots 35 in the rail 15. When the relatively narrow spacing of the cutting wires is desired, the cutting wires are placed in the recesses 29 and the slots 35. To provide the relatively wider spacing of cutting wires, the side rail 15 is provided with a set of similar recesses 38 which co-operate with the set of slots 39 in the side rail 14. Therefore, the slots of the rail 14 and the recesses 38 of the rail 15 provide the complementary wire-attaching means for retaining the wires in wider spaced relation; while the slots 35 of the rail 15 and the recesses 29 of the rail 14 provide similar means for retaining the cutting wires in the relatively narrow spaced relation.

A cutting wire 41 is carried by the cutting frame longitudinally thereof. It is preferably secured, by similar wire-attaching means, to the end rails 16 and 17 so that the wire 41 extends across the frame substantially in the longitudinal axis of the rectangular frame. This wire accomplishes the usual function of dividing the butter print longitudinally and vertically. Means are also provided to divide the print horizontally. For this purpose, a slide 42 is mounted to move back and forth on the cutter frame. The slide has opposed depending arms 43 provided with similar recesses and slot attaching-means for the horizontal cutting wire 44. This wire 44 has the function of dividing the block horizontally and its movement forms the first step in the cutting operation, the block being divided thereby in an upper and lower section ready for the final division into the small oblongs or pats for table use when the frame is downwardly moved on its standard and guiding post. Preferably the upper surface of the plate 8 is provided with a longitudinal groove 45 to receive the cutting wire 41 upon downward movement of the frame. This longitudinal groove is provided, as the wire 41 is preferably below the plane of the transverse cutting wires 28.

The base 7 of the butter cutter adjacent the standard portion is provided with an upright plate 46 against which the end of the print of butter may be set. A vertical slot 47 being cut in this plate so that the longitudinal wire 41 may pass downwardly therethrough when the frame is lowered during the cutting operation.

In Figure 1 the slide 42 is shown in full lines in its rearward position which it assumes after having completed the horizontal cutting of the butter print. This figure also shows, in dotted lines, the forward position assumed by the slide preparatory to its rearward butter-cutting travel. Preferably, a stop is provided on the under face of the frame to prevent the slide being accidentally removed from the frame. Such stop is here shown as a screw 48 against which one of the depending arms 43 of the slide may contact and further forward movement of the slide be thereby limited. In this same figure the frame is diagrammatically indicated, by dotted lines, in its operative position after the frame has been raised so that the hub flange 23 rests upon the posts 22.

Having thus described my invention, what I claim as new and desire to secure by Letters Patent is:

1. A butter cutter including a base, a standard and a post thereon, a cutter frame slidable on said standard and on said post for vertical cutting, means on said cutter for horizontal cutting, said standard and post being in adjacent spaced relation at one end of the base whereby interference with the horizontal cutting operation is avoided.

2. A butter cutter including a base, a standard and a guide on the base, a cutter frame slidably mounted on said standard and guide whereby the frame may be accurately guided when raised and lowered, the guide being of less height than the standard whereby upon raising of the frame above the guide, the frame may be turned on said standard and held in raised position by the guide.

3. A butter cutter including a base, a standard and a guide on the base, a cutter frame, a hub slidably and rotatably mounted on said standard, a web connecting said hub and frame, said web being apertured to permit passage of the guide therethrough whereby the frame is accurately guided in raising and lowering, the guide being of less height than the standard whereby, when the frame is raised above the guide, the frame may be turned so that the web will rest upon the guide and the frame be thereby supported.

4. A butter cutter including a base, providing a surface adapted to have a print of butter placed thereon, a cutter frame having a plurality of cutting wires adapted to be downwardly forced through the butter to said surface whereby the butter is cut, the butter-receiving surface being convex whereby, upon contact of the wires with said surface, wire strain is more evenly distributed.

5. A butter cutter including a base, a standard thereon, a cutter frame, butter cutting wires carried thereby, a plurality of sets of oppositely disposed complementary wire-attaching means on one transverse face of said frame whereby the wires may be carried by the frame in different spaced intervals.

6. A butter cutter including a base, a standard thereon, a cutter frame having side and end rails, cutting wires extending across said frame and carried by said rails, each side rail having a plurality of uniformly spaced recesses each to receive and retain one end of a wire, the spaced relation of the recesses of each rail being different, each side rail also having a plurality of uniformly spaced slots each to receive and retain the other end of a wire, the spaced relation of the slots of each rail being similar to the spaced relation of the recesses of the opposite rail.

7. A butter cutter including a base providing a surface adapted to have a print of butter placed thereon, a cutter frame having a plurality of cutting wires adapted to be downwardly forced through the butter to cut the same, means to secure the wires to the frame which includes a recess in the frame, a plug adapted to have a wire end secured thereto and to be received and held in a recess, the plug being cut away to permit drainage of moisture through said recess.

8. A butter cutter including a base, a standard thereon, a cutter frame, butter cutting wires carried thereby, a plurality of differently spaced sets of oppositely disposed complementary wire-attaching means on one transverse face of said frame, whereby the wires may be carried by the frame in different spaced intervals.

9. A butter cutter including a base, a standard thereon, a cutter frame having side and end rails, cutting wires extending across said frame and carried by said rails, each side rail having upon one face a plurality of uniformly spaced recesses each to receive and retain one end of a wire, the spaced relation of the recesses of each rail being different, each side rail also having upon said same face a plurality of uniformly spaced slots each to receive and retain the other end of a wire, the spaced relation of the slots of each rail being similar to the spaced relation of the recesses of the opposite rail.

In witness whereof, I have hereunto set my hand this 20th day of October 1920.

GUSTAF A. SELVIG.